US011392948B2

(12) United States Patent
Benkreira et al.

(10) Patent No.: US 11,392,948 B2
(45) Date of Patent: *Jul. 19, 2022

(54) METHOD AND SYSTEM FOR USER ADDRESS VALIDATION

(71) Applicant: Capital One Services, LLC, McLean, VA (US)

(72) Inventors: Abdelkader M'Hamed Benkreira, New York, NY (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 219 days.

This patent is subject to a terminal disclaimer.

(21) Appl. No.: 16/880,063

(22) Filed: May 21, 2020

(65) Prior Publication Data

US 2020/0380519 A1 Dec. 3, 2020

Related U.S. Application Data

(63) Continuation of application No. 16/423,759, filed on May 28, 2019, now Pat. No. 10,664,840.

(51) Int. Cl.
*G06Q 20/40* (2012.01)
*G06F 16/29* (2019.01)
*G06Q 20/30* (2012.01)
*G06Q 20/32* (2012.01)

(52) U.S. Cl.
CPC ......... *G06Q 20/4014* (2013.01); *G06F 16/29* (2019.01); *G06Q 20/3224* (2013.01); *G06Q 20/4093* (2013.01)

(58) Field of Classification Search
CPC .......... G06Q 20/4014; G06Q 20/3224; G06Q 20/4093; G06F 16/29
USPC .......................................................... 705/75
See application file for complete search history.

(56) References Cited

U.S. PATENT DOCUMENTS

| | | | | |
|---|---|---|---|---|
| 2015/0142595 A1* | 5/2015 | Acuna-Rohter | ... | G06Q 20/4016 705/21 |
| 2016/0125412 A1* | 5/2016 | Cannon | ............ | G06Q 20/4014 705/44 |
| 2017/0140174 A1* | 5/2017 | Lacey | ................ | G06Q 20/4016 |
| 2018/0204204 A1* | 7/2018 | Giraudo | ............... | G06Q 20/047 |
| 2019/0019184 A1* | 1/2019 | Lacey | ............. | G06Q 20/40145 |
| 2019/0139024 A1* | 5/2019 | Bakshi | ............... | G06Q 20/3224 |

* cited by examiner

*Primary Examiner* — James D Nigh
(74) *Attorney, Agent, or Firm* — DLA Piper LLP (US)

(57) ABSTRACT

A system and method for validating user address information is disclosed herein. A computing system periodically polls a client device associated with a user to identify a current location of the user. The computing system records the current location of the user after polling and a time associated with the polling. The computing system receives one or more transactions from one or more third party vendors. The computing system identifies, based on the one or more transactions, a location and a time associated with each transaction in the one or more transactions. The computing system defines a geographic area. The computing system determines that a current primary address on file for the user is outside of the geographic area. The computing system prompts, based on the determining, the user to update the current primary address.

20 Claims, 6 Drawing Sheets

METHOD AND SYSTEM FOR USER ADDRESS VALIDATION

CROSS-REFERENCE TO RELATED APPLICATION INFORMATION

This is a continuation of U.S. patent application Ser. No. 16/423,759, filed May 28, 2019, which is incorporated herein by reference in its entirety.

FIELD OF THE DISCLOSURE

The present disclosure generally relates to a system and method for validating user address information.

BACKGROUND

Conventionally, when an individual moves or changes locations, that individual may update their banking records accordingly. For example, when a user moves from a first address to a second address, the user may update their banking records such that the appropriate zip code or other primary address information may be used to complete or authenticate an account transaction. As those skilled in the art recognize, such updates may be tedious or forgotten. Accordingly, when trying to complete a transaction, a user may provide incorrect primary address information, resulting in a rejected transaction request.

SUMMARY

Embodiments disclosed herein generally relate to a system and method for validating user address information. In some embodiments, a method of validating user address information is disclosed herein. A computing system periodically polls a client device associated with a user to identify a current location of the user. The computing system records the current location of the user after polling and a time associated with the polling. The computing system receives one or more transactions from one or more third party vendors. The computing system identifies, based on the one or more transactions, a location and a time associated with each transaction in the one or more transactions. The computing system defines a geographic area. The geographic area includes a potential primary address associated with the user based on the recorded current location of the user and the location associated with each transaction. The computing system determines that a current primary address on file for the user is outside of the geographic area. The computing system prompts, based on the determining, the user to update the current primary address.

In some embodiments, prompting the user to update the current primary address includes the computing system generating a message. The message includes a message asking whether the user has moved from the current primary address. The computing system transmits the message to the client device.

In some embodiments, receiving one or more transactions from one or more third party vendors includes the computing system receiving a location associated with a third party vendor and a transaction time associated with a transaction with the third party vendor.

In some embodiments, the computing system further identifies that a transaction in the one or more transactions is a card-not-present transaction. The computing system further determines an internet protocol address from which the transaction originated.

In some embodiments, the computing system further determines a geographic location corresponding to the internet protocol address.

In some embodiments, periodically polling the client device associated with the user to identify the current location of the user includes the computing system requesting from the client device the current location of the client device.

In some embodiments, defining the geographic area that includes the potential primary address associated with the user based on each recorded current location of the user and each location associated with each transaction includes the computing system determining a frequency at which the user transacts at each third party merchant in the one or more transactions.

In another embodiment, a system is disclosed herein. The system includes a processor and a memory. The memory has programming instruction stored thereon, which, when executed by the processor, performs one or more operations. The one or more operations include receiving one or more transactions from one or more third party vendors. The one or more operations further include identifying, based on the one or more transactions, a location and a time associated with each transaction in the one or more transactions. The one or more operations further include defining a geographic area. The geographic area includes a potential primary address associated with a user of a client device based on the location and the time associated with each transaction. The one or more operations further include determining that a current primary address on file for the user is outside of the geographic area. The one or more operations further include prompting, based on the determination, the user to update the current primary address.

In some embodiments, prompting the user to update the current primary address includes generating a message that includes a message asking whether the user has moved from the current primary address and transmitting the message to the client device.

In some embodiments, receiving the one or more transactions from one or more third party vendors includes receiving a transaction location associated with a third party vendor and a transaction time associated with a transaction with the third party vendor.

In some embodiments, the one or more operations further include identifying that a transaction in the one or more transactions is a card-not-present transaction. The one or more operations further include determining an internet protocol address from which the transaction originated.

In some embodiments, the one or more operations further include determining a geographic location corresponding to the internet protocol address.

In some embodiments, the one or more operations further include periodically requesting, from the client device associated with the user, a current location of the user.

In some embodiments, defining the geographic area that includes the potential primary address associated with the user based on the location and the time associated with each transaction further includes further defining the geographic area based on the periodic requesting of the current location of the user.

In some embodiments, defining the geographic area that includes the potential primary address associated with the user based on the location and the time associated with each transaction includes determining a frequency at which the user transacts at each third party merchant in the one or more transactions.

In another embodiment, a non-transitory computer readable medium is disclosed herein. The non-transitory computer readable medium includes one or more instructions which, when executed by one or more processors, cause the one or more processors to perform operations. The operations include periodically polling a client device associated with a user to identify a current location of the user. The operations include recording each current location of the user after each polling and a time associated with the polling. The operations include receiving one or more transactions from one or more third party vendors. The operations include identifying based on the one or more transactions, a location and a time associated with each transaction in the one or more transactions. The operations include defining a geographic area. The geographic area includes a potential primary address associated with the user based on each recorded current location of the user and each location associated with each transaction. The operations include determining that a billing zip code on file for the user is outside of the geographic area. The operations include prompting, based on the determining, the user to update the billing zip code.

In some embodiments, prompting the user to update the billing zip code includes generating a message that includes a message asking whether the user has moved from the current primary address and transmitting the message to the client device.

In some embodiments, receiving one or more transactions from one or more third party vendors includes receiving a transaction location associated with a third party vendor and a transaction time associated with a transaction with the third party vendor.

In some embodiments, the operations further include identifying that a transaction in the one or more transactions is a card-not-present transaction. The operations further include determining an internet protocol address from which the transaction originated.

In some embodiments, periodically polling, by the computing system, the client device associated with the user to identify the current location of the user includes requesting from the client device the current location of the client device.

In some embodiments, defining the geographic area includes determining a frequency at which the user transacts at each identified at each third party merchant in the one or more transactions.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to a system and method of validating user addresses. For example, the one or more techniques disclosed herein leverage user transaction data and user location data to determine whether the user's primary address has changed. Such information may further be leveraged to detect fraudulent activity on the user's account.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
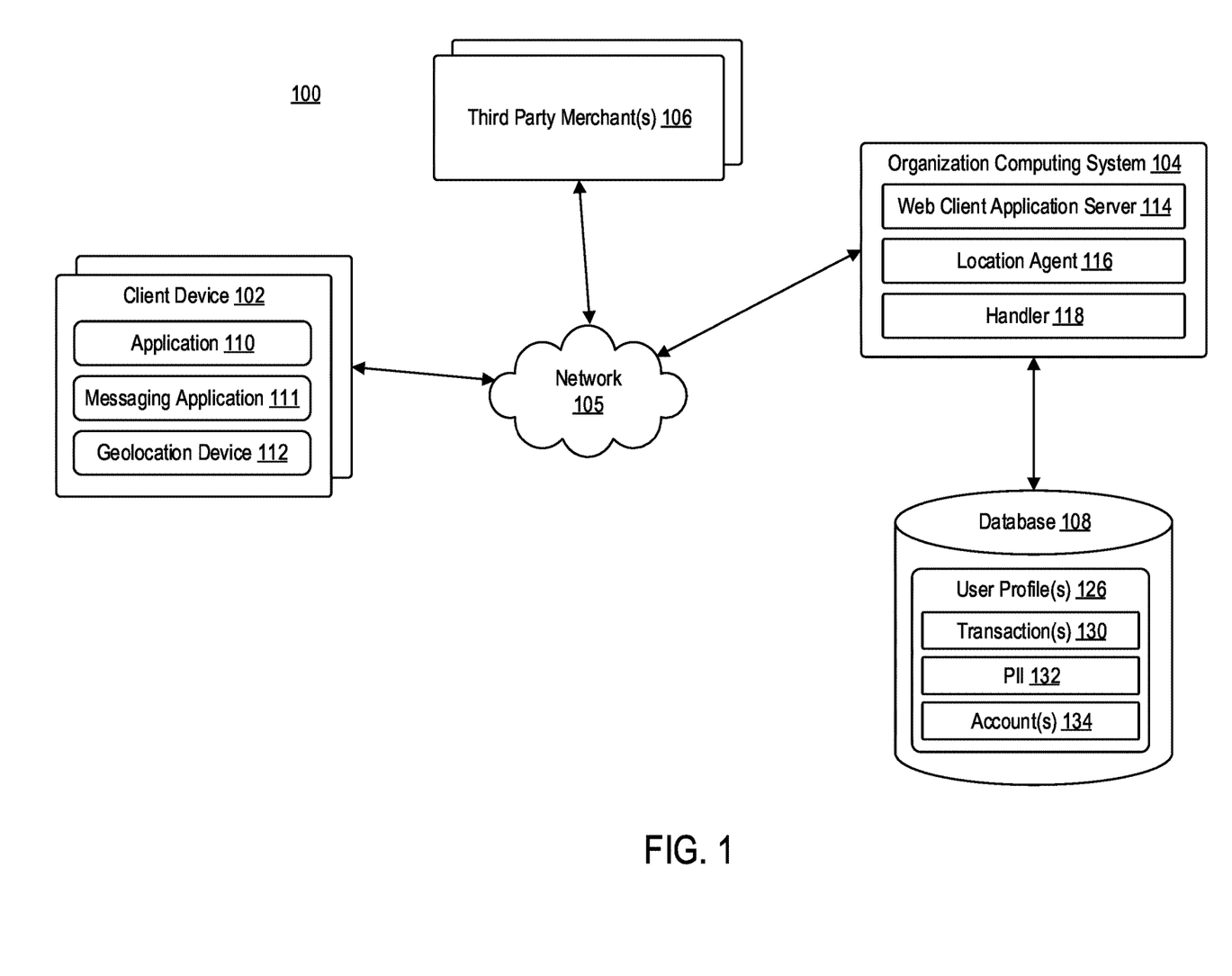
FIG. 1 is a block diagram illustrating a computing environment, according to example embodiments.

FIG. 1 is a block diagram illustrating a computing environment 100, according to one embodiment. Computing environment 100 may include at least a client device 102, an organization computing system 104, third party merchants 106, and a database 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of system 100.

Client device 102 may be operated by a user. For example, client device 102 may be a mobile device, a tablet, a desktop computer, or any computing system having the capabilities described herein. Client device 102 may belong to or be provided to a user or may be borrowed, rented, or shared. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 110, messaging application 111, and geolocation device 112. Application 110 may be representative of a web browser that allows access to a website or a stand-alone application. Client device 102 may access application 110 to access functionality of organization computing system 104. Client device 102 may communicate over network 105 to request a webpage, for example, from web client application server 114 of organization computing system 104. For example, client device 102 may be configured to execute application 110 to access content managed by web client application server 114. The content that is displayed to client device 102 may be transmitted from web client application server 114 to client device 102, and subsequently processed by application 108 for display through a graphical user interface (GUI) of client device 102.

Messaging application 111 may be representative of a web browser that allows access to a website or a stand-alone application. In some embodiments, client device 102 may be configured to execute messaging application 111 to access an email account managed by a third party web server. In some embodiments, client device 102 may be configured to execute messaging application 111 to transmit one or more messages (e.g., SMS messages, iMessages, electronic mail message, etc.) to one or more remote computing devices.

Geolocation device 112 may be representative of an application that identifies or estimates the real-word geographic location of client device 102. In some embodiments, geolocation device 112 may utilize radio-frequency identification (RFID), global position system (GPS), Bluetooth, internet protocol (IP) address, media access control (MAC) address, WiFi, and the like to identify or estimate the real-world geographic location of client device 102.

Organization computing system 104 may include at least web client application server 114, location agent 116, and handler 118. Each of location agent 116 and handler 118 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instruction.

Location agent 116 may be configured to validate a primary address of the user. Location agent 116 may validate a primary address of the user by tracking transactions associated with the users account. Each incoming transaction may include location information associated therewith. In some embodiments, the location information may be as broad as a particular state in which the transaction occurred. In some embodiments, the location information may be more granular and include one or more of a city, state, and zip code of where the transaction occurred. Yet further, in some embodiments, the location information may be even more granular and include a street address of the merchant with which the user transacted. In some embodiments, location agent 116 may receive the location information from one or more third party merchants 106, upon receiving a transaction request.

In some embodiments, location agent 116 may further leverage location tracking of client device 102 to identify a user's location. For example, location agent 116 may interface with geolocation device 112 to request a location of the user during or around the time of a transaction. In some embodiments, such as those when the user is implementing a mobile payment (e.g., Apple Pay, Google Wallet, Chase Pay, etc.), location agent 116 may receive location information directly from client device 102.

Location agent 116 may leverage location information from third party merchants 106 and/or client device 102 to validate a user's primary address. For example, if location agent 116 identifies a pattern of transactions in a location that differs from the user's primary address, location agent 116 may determine that the user's primary location may have changed. Accordingly, location agent 116 may prompt the user, via client device 102, to confirm or deny whether the user's primary address has changed. In some embodiments, such operations may help identify potential fraudulent activity on the user's account.

Handler 118 may be configured to manage an account associated with each user. For example, account handler 118 may be configured to communicate with database 108. As illustrated, database 108 may include one or more user profiles 126. Each user profile 126 may correspond to a user with an account with organization computing system 104. Each user profile 126 may include one or more transactions 130, personal identification information 132, and one or more accounts 134.

Each of one or more transactions 130 may correspond to transaction associated with an account of the user. Such transactions may include, but are not limited to, checking account transactions, savings account transactions, credit card transactions, ATM card transactions, transfer transactions, and the like.

Personal identification information 132 may correspond to one or more items of information associated with the user. Such personal identification information 132 may include, but is not limited to, user name, password, date of birth, social security number, address, full legal name, telephone number, billing zip code, salary information, and the like.

Accounts 134 may correspond to each account a particular user has with the organization associated with organization computing system 104. Exemplary accounts may include, but are not limited to, checking accounts, savings accounts, money market accounts, individual retirement accounts, and the like.

Figure 2:
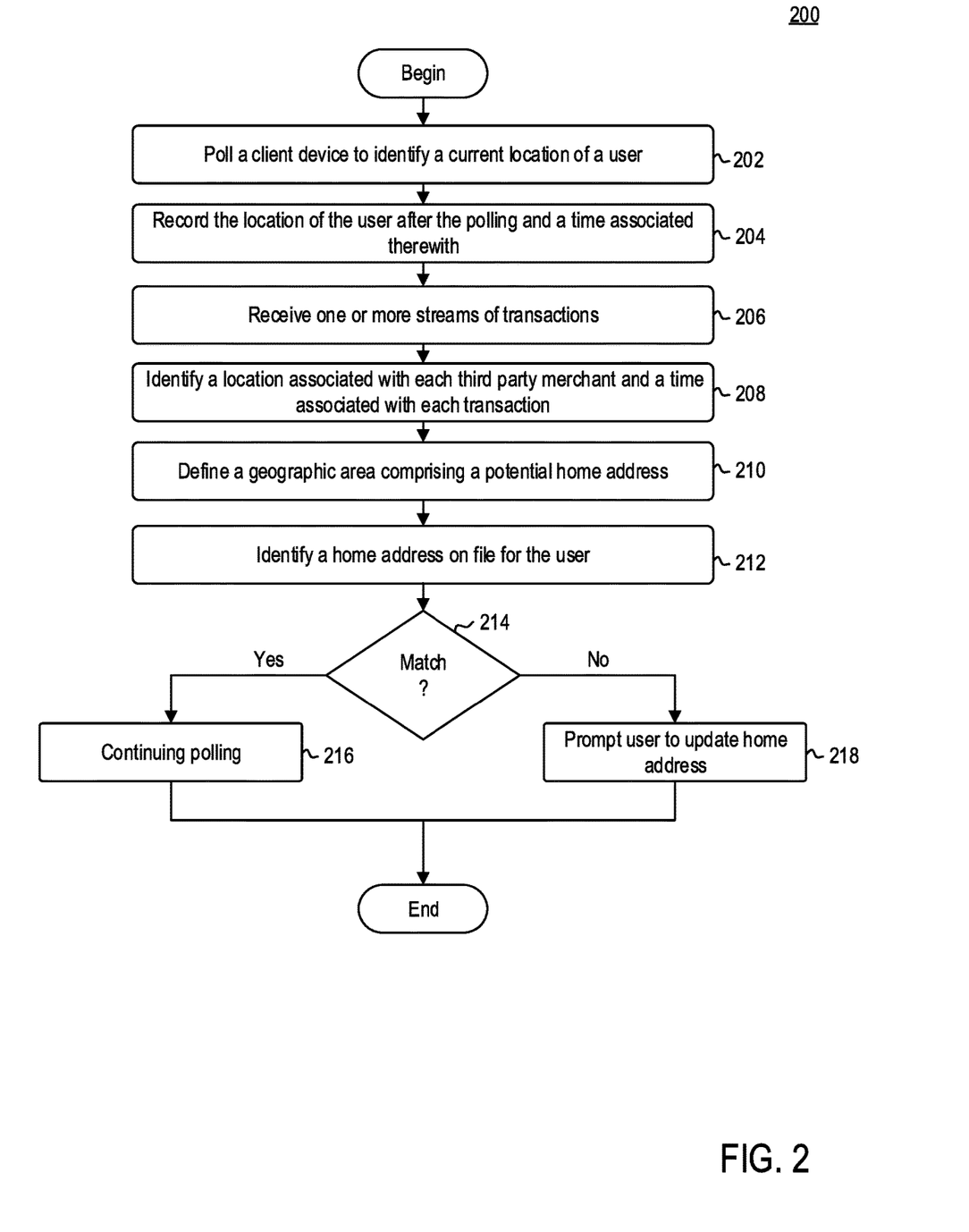
FIG. 2 is a flow diagram illustrating a method of validating a user's primary address, according to example embodiments.

FIG. 2 is a flow diagram illustrating a method 200 of validating a user's primary address, according to example embodiments. Method 200 may begin at step 202.

At step 202, organization computing system 104 may poll a client device to identify a current location of the user. For example, location agent 116 may continually or periodically communicate with client device 102 to determine a current location of the user. In some embodiments, location agent 116 may submit request to client device 102 for client device 102 to share a current location of the user. In some embodiments, location agent 116 may interface with geolocation device 112 to identify a current location of the user. Still further, in some embodiments, location agent 116 may receive location information from geolocation device 112 upon a user interacting with application 110.

At step 204, organization computing system 104 may record the location of the user after the polling and a time associated therewith. For example, upon receiving current location information for the user, handler 118 may store the current location information in database 106. By continually or periodically polling client device 102 and storing the current location information in database 106, handler 118 may create a historical record for the user. Such record may be used in subsequent analyses to determine if the user's primary address has changed. Such record may further be used in subsequent analyses to determine if there is fraudulent activity on the user's account.

At step 206, organization computing system 104 may receive one or more transactions. For example, organization computing system 104 may receive a plurality of transaction requests from a plurality of third party merchants 106. A transaction request may refer to an attempt by a user to purchase goods and/or services from a third party merchant 106. To complete the purchase, a respective third party merchant 106 may submit a transaction request to organization computing system 104 to ensure that the user has sufficient funds to complete the purchase. Such transaction request may further be used to authenticate the user, to ensure that there is not fraudulent activity on the user's account.

At step 208, organization computing system 104 may identify a location associated with each third party merchant and a time associated with each transaction. For example, each transaction request may include one or more parameters associated therewith. Such parameters may include, but are not limited to, an amount requested, a merchant identifier, a merchant category code, a card-present notification, a card-not-present notification, a user's account number, a user's zip code, a merchant name, a location associated with the user, an internet protocol (IP) address associated with a merchant computer, and the like. Handler 118 may parse the one or more parameters to identify a location of the third party merchant 106 submitting the transaction request and a time of receipt of the transaction request.

At step 210, organization computing system 104 may define a geographic location that includes a potential primary address of the user. For example, location agent 116 may parse the location information associated with the user (i.e., the recorded location and associated time entries), and define a geographic area that encompasses the recorded locations of the user. In some embodiments, location agent 116 may define the geographic area based on the type of transaction conducted and/or the frequency of transactions. For example, location agent 116 may disregard those transactions that include a card-not-present transaction, as such transactions are typically associated with online purchases. In other words, location agent 116 may focus on those transactions that involved the physical swipe or insertion of a bank card, credit card, debit card, and the like. In another example, transactions that relate to travel (such as a vacation or business trip) may not be factored into the geographic range. Instead, organization computing system 104 may be configured to identify travel related expenses through other methods. For example, the user may transmit a message to organization computing system 104 notifying organization computing system 104 that the user is traveling. In another example, organization computing system 104 may be configured to deduce that the user is traveling by identifying flight, train, hotel, or rental car transactions. In another example, organization computing system 104 may be configured to deduce that the user is traveling by identifying tourist related transactions, such as, but not limited to, an amusement park, atypical leisure activities, atypical dining transactions, and the like.

While there are some transactions that are typical of a user being away from home (e.g., vacation or business trip), there are also transactions that indicate the user is residing at home. For example, location agent 116 may take into account whether user transactions include gas station, grocery store, convenience store, hardware store, gardening store transactions, and the like, when creating a geographic area. For these transactions, identifying repeat transactions may aid in confidently predicting that the transactions are taking place around the user's home/primary residence.

In further embodiments, the frequency of transactions may aid in organization computing system 104 determining the geographic area of the user. For example, travel transactions are typically infrequent, while near-home transactions are more frequent and matter more for predicting an address change.

At step 212, organization computing system 104 may identify a primary address on file for the user. For example, handler 118 may query database 106 to retrieve a primary address for the user. Such primary address information may be included in personal identification information associated with the user.

At step 214, organization computing system 104 may compare the primary address on file to the geographic area defined in step 210. In other words, location agent 116 may determine whether the primary address of the user is within the defined geographic area. The primary address being included in the defined geographic area may signal to organization computing system 104 that the primary address is indeed correct.

If, at step 214, organization computing system 104 determines that the primary address on file is within the geographic area, then method 200 may proceed to step 216. At step 216, organization computing system 104 may continue polling client device 102 for location information.

If, however, at step 214, organization computing system 104 determines that the primary address on file is not within the defined geographic area, then method 200 may proceed to step 218. At step 218, organization computing system 104 may prompt the user to update the primary address. For example, location agent 116 may prompt client device 102 to update the primary address of the user, or to confirm that the user is traveling or is outside his or her normal geographic area.

Figure 3:
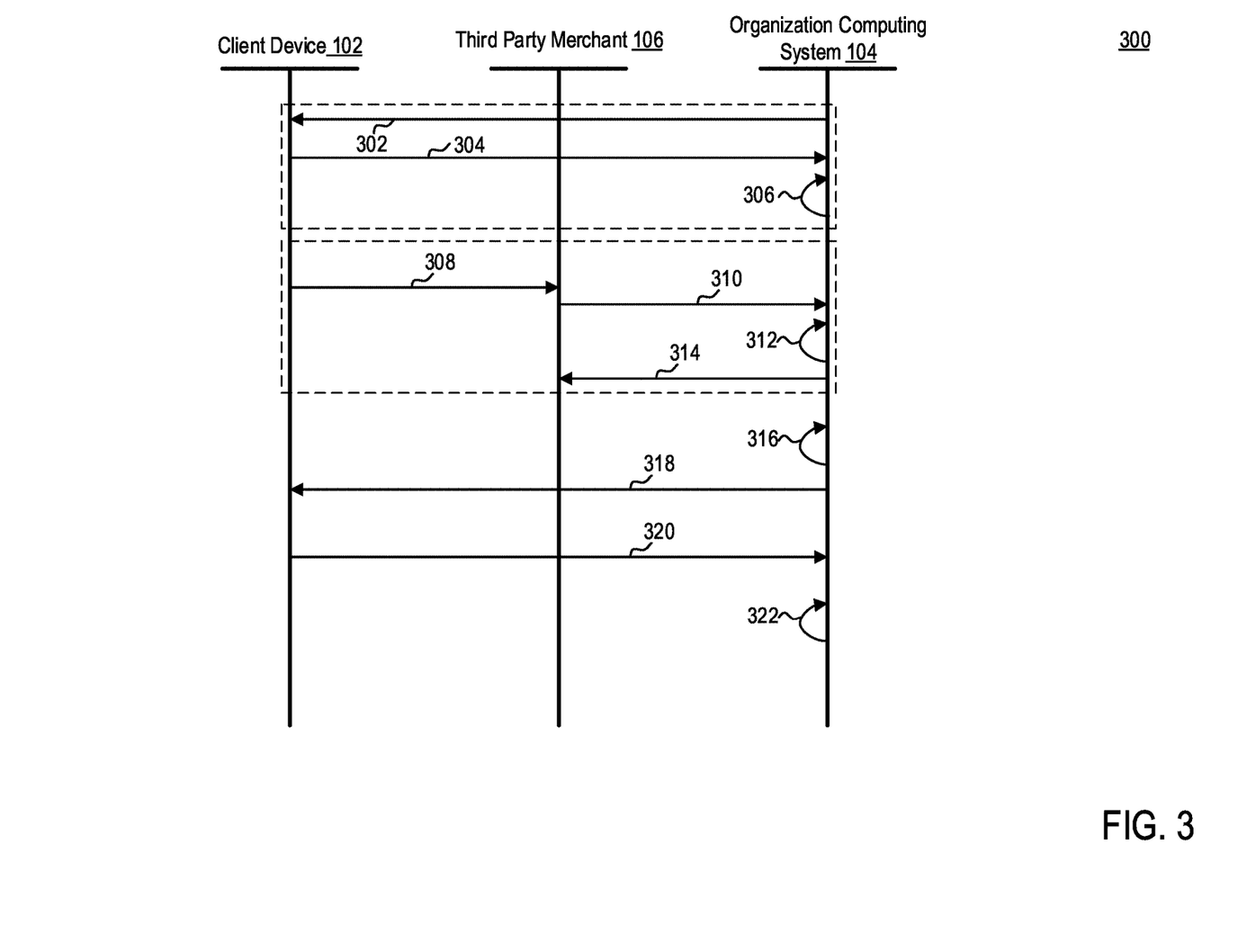
FIG. 3 is a block diagram illustrating operations associated with validating a user's primary address, according to example embodiments.

FIG. 3 is a block diagram 300 illustrating one or more operations associated with validating a user's primary address, according to example embodiments.

Operations 302-306 may define the continual or periodic polling of client device 102 for location information. For example, at operation 302, organization computing system 104 may poll a client device to identify a current location of the user. In some embodiments, location agent 116 may submit request to client device 102 for client device 102 to share a current location of the user. In some embodiments, location agent 116 may interface with geolocation device 112 to identify a current location of the user. Still further, in some embodiments, location agent 116 may receive location information from geolocation device 112 upon a user interacting with application 110.

At operation 304, client device 102 may receive the polling request from organization computing system 104. In some embodiments, client device 102 may leverage geolocation device 112 to identify current location information associated with the user. In some embodiments, client device 102 may provide organization computing system 104 with access to location services, i.e., access to geolocation device 112. In some embodiments, client device 102 may provide organization computing system 104 with limited access to location services. For example, i.e., access to geolocation device 112 when user is interacting with application 110. Client device 102 may transmit such location information to organization computing system 104.

At operation 306, organization computing system 104 may receive the location information from client device 102. Organization computing system 104 may record the location of the user after the polling and a time associated therewith. For example, upon receiving current location information for the user, handler 118 may store the current location information in database 106.

The functions associated with operations 302-306 may be performed a plurality of times. By continually or periodically polling client device 102 and storing the current location information in database 106, handler 118 may create a historical record for the user. Such record may be used in subsequent analyses to determine if the user's primary address has changed. Such record may further be used in subsequent analyses to determine if there is fraudulent activity on the user's account.

Operations 308-312 may define one or more operations associated with receiving and processing a transaction request. For example, at operation 308, a client device 102 attempts to purchase goods and/or services from third party merchant 106. In some embodiments, the purchase attempt may be a card-present transaction (i.e., an insertion or swipe of a physical card associated with the user's account). In some embodiments, the purchase attempt may be a non-contact transaction (e.g., Apple Pay, Chase Pay, Google Wallet, RFID, etc.). In some embodiments, the purchase attempt may be a card-not-present transaction (e.g., entering bank card information into a website).

At operation 310, third party merchant 106 may receive a purchase attempt from client device 102. Third party merchant 106 may transmit a transaction request to organization computing system 104 upon receiving the purchase attempt. Such transaction request may be used by a respective third party merchant 106 to ensure that the user has sufficient funds to complete the purchase. Such transaction request may further be used to authenticate the user, to ensure that there is not fraudulent activity on the user's account.

At operation 312, organization computing system 104 may receive the transaction request from third party merchant 106. Handler 118 may determine whether to grant the transaction request received from third party merchant 106. For example, each transaction request may include one or more parameters associated therewith. Such parameters may include, but are not limited to, an amount requested, a merchant identifier, a merchant category code, a card-present notification, a card-not-present notification, a user's account number, a user's zip code, a merchant name, a location associated with the user, an internet protocol (IP) address associated with a merchant computer, and the like. Handler 118 may determine that the user (1) has sufficient funds in his or her account to complete the transaction request; and (2) identifying information in the request matches identifying information in database 106 for the user. In some embodiments, handler 118 may further identify a location associated with each third party merchant and a time associated with each transaction. Handler 118 may parse the one or more parameters to identify a location of the third party merchant 106 submitting the transaction request and a time of receipt of the transaction request.

At operation 314, organization computing system 104 may notify third party merchant 106 of whether it approved or rejected the transaction request. For purposes of the present discussion, assume that organization computing system 104 notifies third party merchant 106 that the transaction request is proper.

At operation 316, organization computing system 104 may define a geographic location that includes a potential primary address of the user. For example, location agent 116 may parse the location information associated with the user (i.e., the recorded location and associated time entries), and define a geographic area that encompasses the recorded locations of the user. Handler 118 may then identify a primary address on file for the user. For example, handler 118 may query database 106 to retrieve a primary address for the user. Such primary address information may be included in personal identification information associated with the user.

In some embodiments, organization computing system 104 may determine that the primary address on file is within the geographic area. In such a case, organization computing system 104 may continue polling client device 102 for location information. In some embodiments, organization computing system 104 may determine that the primary address on file is not within the defined geographic area. In such a case, organization computing system 104 may prompt to user to update the primary address. For example, location agent 116 may prompt client device 102 to update the primary address of the user, or to confirm that the user is traveling or is outside his or her normal geographic area. For purposes of this discussion, assume that organization computing system 104 determines that the user's primary address is not within the geographic area.

At operation 318, organization computing system 104 may prompt the user to validate his or her primary address. For example, organization computing system 104 may transmit an electronic message to client device 102, asking the user if the primary address on file is indeed the user's primary address. In another example, organization computing system 104 may transmit an electronic message to client device 102, asking the user if the user is currently traveling outside of his or her primary address. In another example, organization computing system 104 may ask the user if he or she recently transacted at various third party merchants 106 included in the geographic area.

At operation 320, client device 102 may receive the one or more prompts from organization computing system 104. Client device 102 may, in turn, transmit a response to organization computing system 104. Such response may be, for example, an electronic message in reply to the electronic message transmitted from organization computing system 104 to client device 102. Exemplary responses may be, for example: yes, that address information is correct; no, that address information is not correct; I made those purchases; I did not make those purchases; and the like.

At operation 322, organization computing system 104 may receive the response from client device 102. Organization computing system 104 may process the response accordingly. For example, if the user affirmed the address information, organization computing system 104 may continue polling. In another example, if the user responded saying that information is not correct, organization computing system 104 may prompt the user to update the primary address information. In another example, if the user did not make those purchases, organization computing system 104 may place a spending freeze on user's account.

Figure 4:
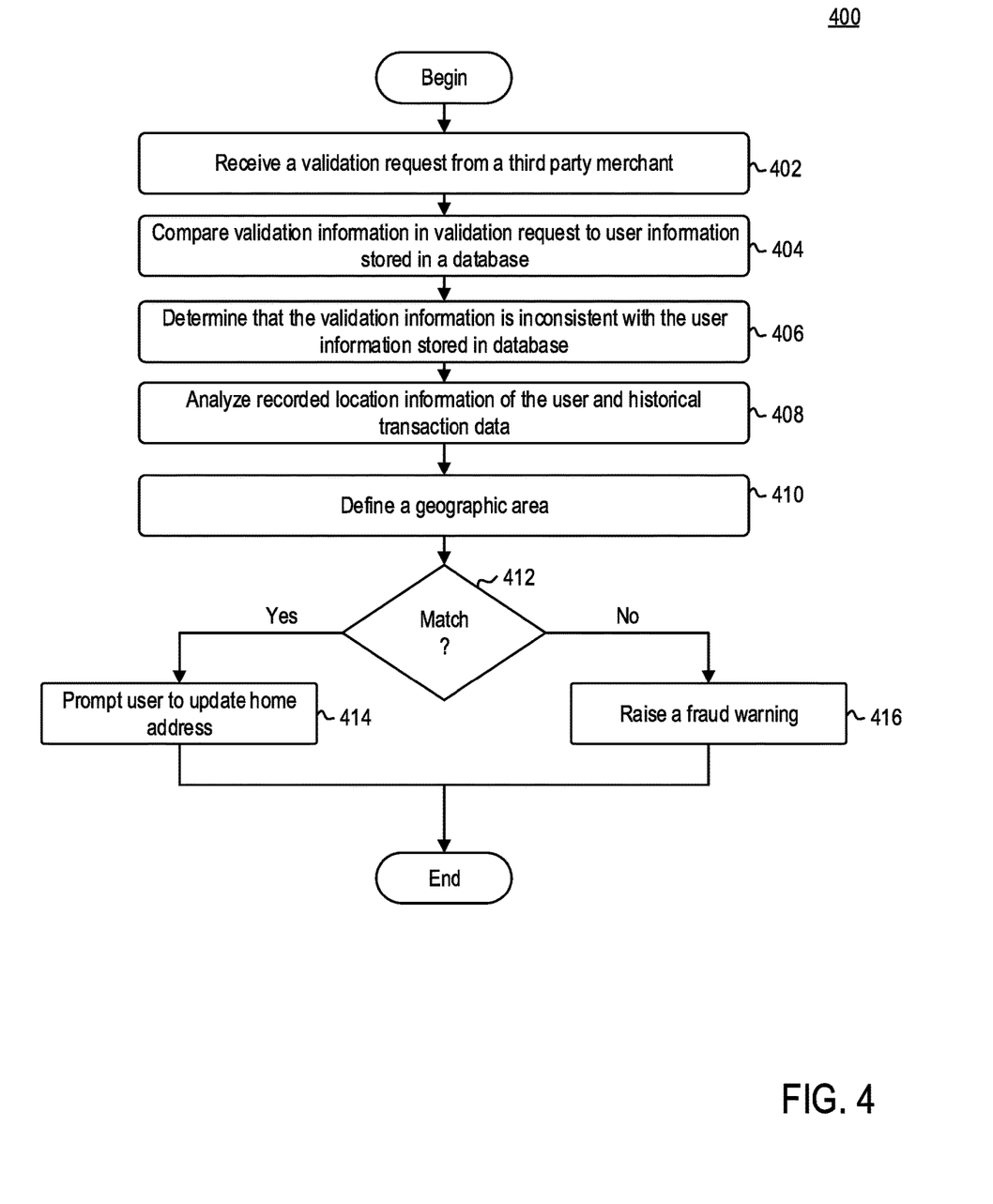
FIG. 4 is a flow diagram illustrating a method of validating a user's primary address, according to example embodiments.

FIG. 4 is a flow diagram illustrating a method 400 of validating a user's primary address, according to example embodiments. Method 400 may begin at step 402.

At step 402, organization computing system 104 may receive a validation request from a third party merchant 106. A validation request may be included in a transaction request from third party merchant 106 to organization computing system 104. Such validation request may include, for example, a user's account number, a street address (provided by the user), and/or zip code (provided by the user) associated with a user's account.

At step 404, organization computing system 104 may compare the validation information in the validation request to user information stored in database 108. For example, handler 118 may query database 108 to pull primary address information for a particular user. Handler 118 may compare portions of the validation request (e.g., street address and/or zip code) to information stored in database 108.

At step 406, organization computing system 104 may determine that the validation information is inconsistent with the user information stored in database 108. For example, when comparing the received street address and/or zip code information to the primary address information from database 108, handler 118 may have determined that the two sets of information differ (i.e., are not consistent).

At step 408, organization computing system 104 may analyze recorded location information of the user and historical transaction data. For example, as recited above in conjunction with FIGS. 2 and 3, organization computing system 104 may poll client device 102 associated with a user for location information of the user (e.g., recorded location information). Organization computing system 104 may also receive location information from a variety of third party merchants 106 with which the user has transacted (e.g., historical transaction data).

At step 410, organization computing system 104 may define a geographic area. For example, location agent 116 may define a geographical boundary based on the recorded location information and historical transaction data of the user.

At step 412, organization computing system 104 may compare the received validation information to the geographic area defined in step 410. In other words, location agent 116 may determine whether the validation information (i.e., potential primary address) is within the defined geographic area. The potential primary address being included in the defined geographic area may signal to organization computing system 104 that the user's address has changed.

If, at step 412, organization computing system 104 determines that the potential primary address on file is within the geographic area, then method 400 may proceed to step 414. At step 216, organization computing system 104 may prompt the user to update his or her primary address.

If, however, at step 412, organization computing system 104 determines that the potential primary address on file is not within the defined geographic area, then method 400 may proceed to step 416. At step 416, organization computing system 104 may raise a fraud warning on the users account. In other words, because the user's location was inconsistent with the locations of user transactions, organization computing system 104 may conclude that there is fraudulent activity on the user's account.

Figure 5A:
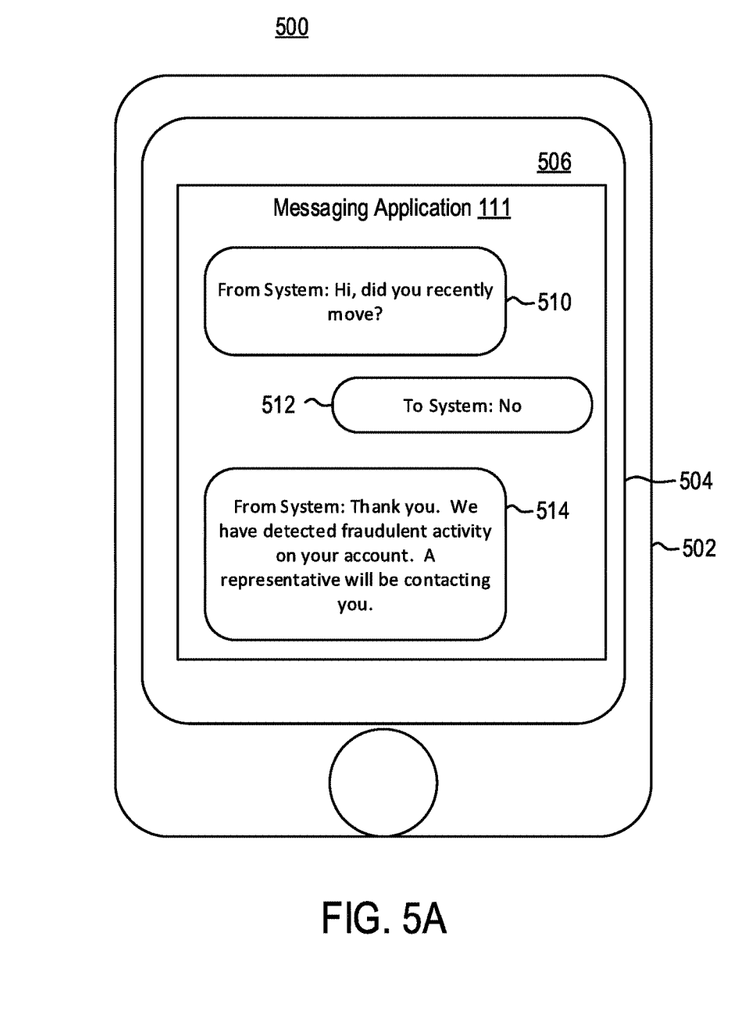
FIG. 5A is a block diagram illustrating an exemplary client device, according to example embodiments.

FIG. 5A is a block diagram 500 illustrating an exemplary client device 502, according to example embodiments. Client device 502 may be similar to client device 102.

As illustrated, client device 502 can include screen 504. Screen 504 may be displaying graphical user interface (GUI) 506. GUI 506 may capture interaction of client device 502 and organization computing system 104 via messaging application 111.

As illustrated, messaging application 111 may include a first message 510, a second message 512, and a third message 514. First message 510 may be transmitted from organization computing system 104 to client device 502. First message 510 may recite: "Hi, did you recently move?" In other words, first message 510 may be a request from organization computing system 104 for the user to verify the user's primary address, based on transaction data. For example, first message 510 may be triggered as a result of organization computing system 104 noticing that the user's recent expenditures and location data form a geographic area that does not include the primary address on file.

Second message 512 may be transmitted from client device 502 to organization computing system 104. Second message 512 may recite: "No." Upon receiving second message 512 from client device 502, organization computing system 104 may determine that there is fraudulent activity on the user's account. For example, because there are a number of expenditures in a geographic location that does not include the user's primary address, the user's account may be compromised. Accordingly, organization computing system 104 may transmit third message 514 to client device 502. Third message 514 may recite: "We have detected fraudulent activity on your account. A representative will be contacting you."

Figure 5B:
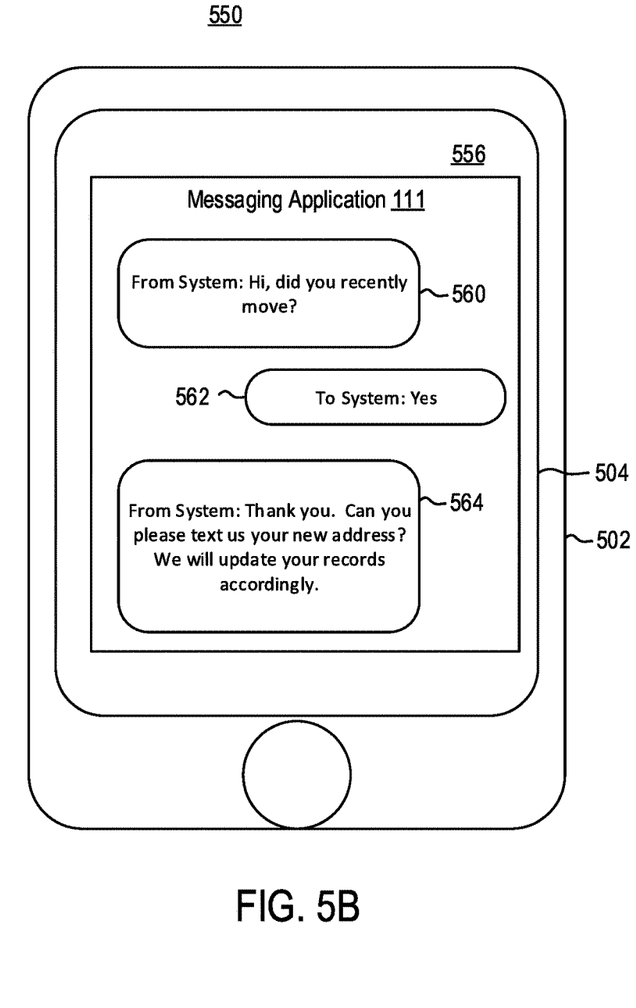
FIG. 5B is a block diagram illustrating an exemplary client device, according to example embodiments.

FIG. 5B is a block diagram 550 illustrating an exemplary client device 502, according to example embodiments. Client device 502 may be similar to client device 102.

As illustrated, client device 502 can include screen 504. Screen 504 may be displaying graphical user interface (GUI) 556. GUI 556 may capture interaction of client device 502 and organization computing system 104 via messaging application 111.

As illustrated, messaging application 111 may include a first message 560, a second message 562, and a third message 564. First message 560 may be transmitted from organization computing system 104 to client device 502. First message 560 may recite: "Hi, did you recently move?" In other words, first message 610 may be a request from organization computing system 104 for the user to verify the user's primary address, based on transaction data. For example, first message 560 may be triggered as a result of organization computing system 104 noticing that the user's recent expenditures and location data form a geographic area that does not include the primary address on file.

Second message 562 may be transmitted from client device 502 to organization computing system 104. Second message 562 may recite: "Yes." Upon receiving second message 512 from client device 502, organization computing system 104 may transmit third message 514 to client device 502. Third message 514 may recite: "Thank you. Can you please text us your new address? We will update your records accordingly."

Figure 6:
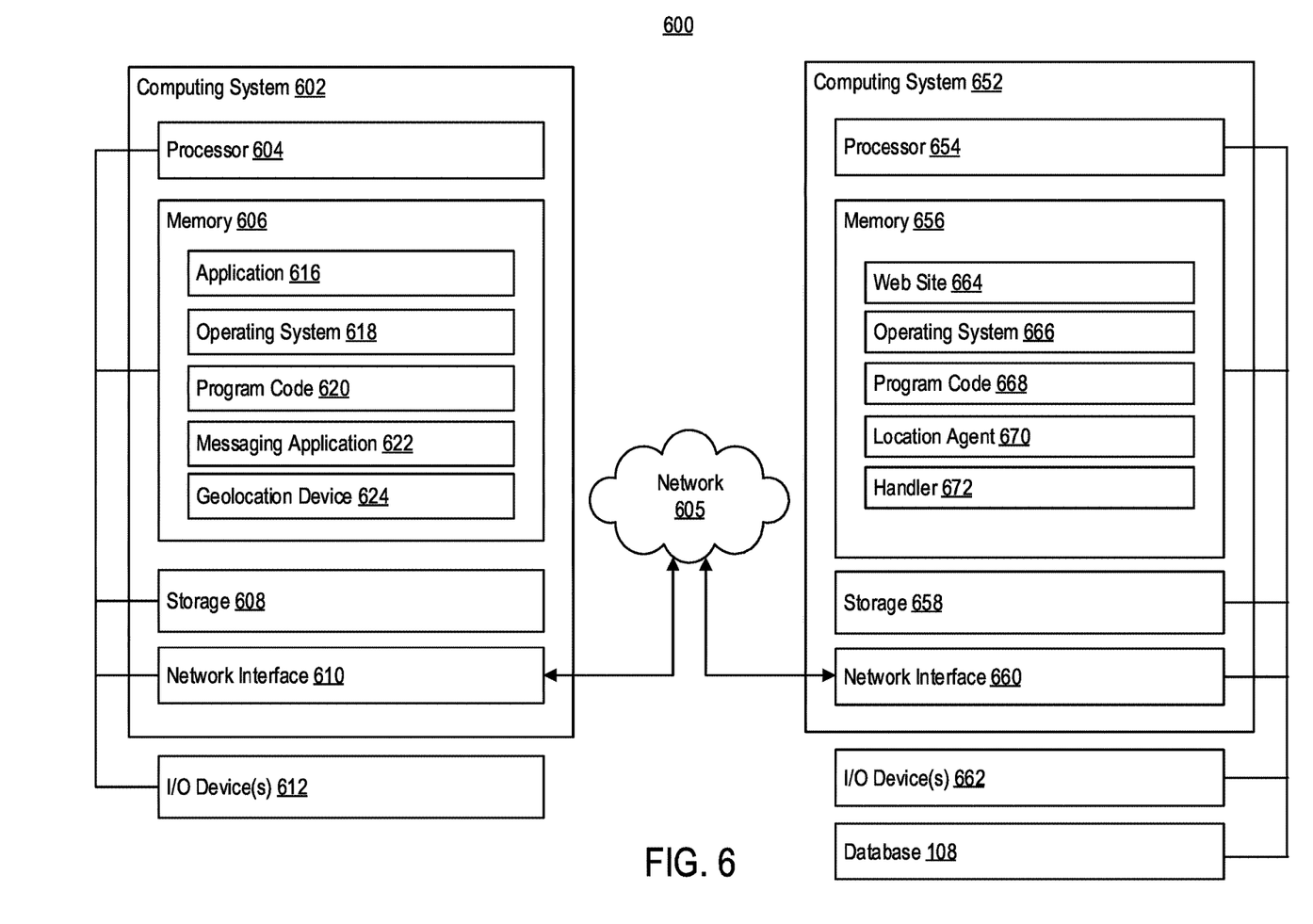
FIG. 6 is a block diagram illustrating a computing environment, according to example embodiments.

FIG. 6 is a block diagram illustrating an exemplary computing environment 600, according to some embodiments. Computing environment 600 includes computing system 602 and computing system 652. Computing system 602 may be representative of client device 102. Computing system 652 may be representative of organization computing system 104.

Computing system 602 may include a processor 604, a memory 606, a storage 608, and a network interface 610. In some embodiments, computing system 602 may be coupled to one or more I/O device(s) 612 (e.g., keyboard, mouse, etc.).

Processor 604 may retrieve and execute program code 620 (i.e., programming instructions) stored in memory 606, as well as stores and retrieves application data. Processor 604 may be included to be representative of a single processor, multiple processors, a single processor having multiple processing cores, and the like. Network interface 610 may be any type of network communications allowing computing system 602 to communicate externally via computing network 605. For example, network interface 610 is configured to enable external communication with computing system 652.

Storage 608 may be, for example, a disk storage device. Although shown as a single unit, storage 608 may be a combination of fixed and/or removable storage devices, such as fixed disk drives, removable memory cards, optical storage, network attached storage (NAS), storage area network (SAN), and the like.

Memory 606 may include application 616, operating system 618, program code 620, messaging application 622, and geolocation device 624. Program code 620 may be accessed by processor 604 for processing (i.e., executing program instructions). Program code 620 may include, for example, executable instructions for communicating with computing system 652 to display one or more pages of website 664. Application 616 may enable a user of computing system 602 to access a functionality of computing system 652. For example, application 616 may access content managed by computing system 652, such as website 664. The content that is displayed to a user of computing system 602 may be transmitted from computing system 652 to computing system 602, and subsequently processed by application 616 for display through a graphical user interface (GUI) of computing system 602.

Messaging application 622 may be representative of a web browser that allows access to a website or a stand-alone application. In some embodiments, computing system 602 may be configured to execute messaging application 622 to access an email account managed by a third party web server. In some embodiments, computing system 602 may be configured to execute messaging application 622 to transmit one or more messages (e.g., SMS messages, iMessages, electronic mail message, etc.) to one or more remote computing devices.

Geolocation device 624 may be representative of an application that identifies or estimates the real-word geographic location of computing system 602. In some embodiments, geolocation device 624 may utilize radio-frequency identification (RFID), global position system (GPS), internet protocol (IP) address, media access control (MAC) address, WiFi, and the like to identify or estimate the real-world geographic location of computing system 602.

Computing system 652 may include a processor 654, a memory 656, a storage 658, and a network interface 660. In some embodiments, computing system 652 may be coupled to one or more I/O device(s) 662. In some embodiments, computing system 652 may be in communication with database 108.

Processor 654 may retrieve and execute program code 668 (i.e., programming instructions) stored in memory 656, as well as stores and retrieves application data. Processor 654 is included to be representative of a single processor, multiple processors, a single processor having multiple processing cores, and the like. Network interface 660 may be any type of network communications enabling computing system 652 to communicate externally via computing network 605. For example, network interface 660 allows computing system 652 to communicate with computer system 602.

Storage 658 may be, for example, a disk storage device. Although shown as a single unit, storage 658 may be a combination of fixed and/or removable storage devices, such as fixed disk drives, removable memory cards, optical storage, network attached storage (NAS), storage area network (SAN), and the like.

Memory 656 may include website 664, operating system 666, program code 668, location agent 670, and handler 672. Program code 668 may be accessed by processor 654 for processing (i.e., executing program instructions). Program code 668 may include, for example, executable instructions configured to perform steps discussed above in conjunction with FIGS. 2-4. As an example, processor 654 may access program code 668 to perform operations related to validating a user's primary address. In another example, processor 654 may access program code 668 to determine whether there is fraudulent activity on the user's account. Website 664 may be accessed by computing system 602. For example, website 664 may include content accessed by computing system 602 via a web browser or application.

Location agent 670 may be configured to validate a primary address of the user. Location agent 670 may validate a primary address of the user by tracking transactions associated with the users account. Each incoming transaction may include location information associated therewith. In some embodiments, the location information may be as broad as a particular state in which the transaction occurred. In some embodiments, the location information may be more granular and include one or more of a city, state, and zip code of where the transaction occurred. Yet further, in some embodiments, the location information may be even more granular and include a street address of the merchant with which the user transacted. In some embodiments, location agent 670 may receive the location information from one or more third party merchants, upon receiving a transaction request.

In some embodiments, location agent 670 may further leverage location tracking of computing system 602 to identify a user's location. For example, location agent 670 may interface with geolocation device 624 to request a location of the user during or around the time of a transaction. In some embodiments, such as those when the user is implementing a mobile payment (e.g., Apple Pay, Google Wallet, Chase Pay, etc.), location agent 670 may receive location information directly from computing system 602.

Location agent 670 may leverage location information from third party merchants and/or computing system 602 to validate a user's primary address. For example, if location agent 670 identifies a pattern of transactions in a location that differs from the user's primary address, location agent 670 may determine that the user's primary location may have changed. Accordingly, location agent 670 may prompt the user, via computing system 602, to confirm or deny whether the user's primary address has changed. In some embodiments, such operations may help identify potential fraudulent activity on the user's account.

Handler 672 may be configured to manage an account associated with each user. For example, account handler 672 may be configured to communicate with database 108.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of validating user address information, comprising:
   identifying, by a computing system, user address information associated with an account of a user;
   monitoring, by the computing system, a user's location based on location information and time information associated with each transaction of a plurality of transactions of the user;
   determining, by the computing system, that the user address information associated with the user is not current;
   prompting, by the computing system, the user to update the user address information;
   receiving, by the computing system in response to the prompting, a new primary address of the user; and
   updating, by the computing system, the user address information on file with the new primary address.

2. The method of claim 1, wherein determining, by the computing system, that the user address information associated with the user is not current comprises:
   filtering the plurality of transactions to identify a set of card-present transactions;
   identifying within the set of card-present transactions a subset of transactions indicative of transactions initiated near a place of residence;
   determining a potential primary address associated with the user based on the location information and the time information associated with each transaction in the subset of transactions; and
   determining that a current primary address of the user address information is a threshold distance from the potential primary address.

3. The method of claim 2, further comprising:
   identifying, by the computing system, that a transaction in the plurality of transactions is a card-not-present transaction; and
   determining, by the computing system, an internet protocol (IP) address from which the transaction originated.

4. The method of claim 3, further comprising:
   determining, by the computing system, a location of the user based on the IP address.

5. The method of claim 4, further comprising:
   further determining the potential primary address associated with the user based on the location of the card-not-present transaction.

6. The method of claim 1, further comprising:
   polling, by the computing system, a client device of the user to confirm the user is proximate the new primary address.

7. The method of claim 1, wherein prompting, by the computing system, the user to update the user address information establishes a dialogue between the computing system and the user.

8. The method of claim 1, further comprising:
   polling, by the computing system, a client device of the user to confirm the user is proximate merchant corresponding to a transaction.

9. A method of validating user address information, comprising:
   identifying, by a computing system, user address information associated with an account of a user;
   monitoring, by the computing system, a user's location based on location information and time information associated with each transaction of a plurality of transactions of the user;
   determining, by the computing system, that the user address information associated with the user is not current;
   prompting, by the computing system, the user to confirm the user address information;
   receiving, by the computing system in response to the prompting, an indication that the user address information is correct; and
   based on the indication, performing, by the computing system, a remedial action on the account.

10. The method of claim 9, wherein determining, by the computing system, that the user address information associated with the user is not current comprises:
    filtering the plurality of transactions to identify a set of card-present transactions;
    identifying within the set of card-present transactions a subset of transactions indicative of transactions initiated near a place of residence;
    determining a potential primary address associated with the user based on the location information and the time information associated with each transaction in the subset of transactions; and
    determining that a current primary address of the user address information is a threshold distance from the potential primary address.

11. The method of claim 10, further comprising:
    identifying, by the computing system, that a transaction in the plurality of transactions is a card-not-present transaction; and
    determining, by the computing system, an IP address from which the transaction originated.

12. The method of claim 11, further comprising:
    determining, by the computing system, a location of the user based on the IP address.

13. The method of claim 12, further comprising:
further determining the potential primary address associated with the user based on the location of the card-not-present transaction.

14. The method of claim 9, further comprising:
polling, by the computing system, a client device of the user to confirm the user is proximate merchant corresponding to a transaction.

15. The method of claim 9, wherein prompting, by the computing system, the user to update the user address information establishes a dialogue between the computing system and the user.

16. A non-transitory computer readable medium including one or more sequences of instructions that, when executed by one or more processors, cause the one or more processors to perform operations comprising:
identifying, by a computing system, user address information associated with an account of a user;
monitoring, by the computing system, a user's location based on location information and time information associated with each transaction of a plurality of transactions of the user;
determining, by the computing system, that the user address information associated with the user is not current;
prompting, by the computing system, the user to update the user address information;
receiving, by the computing system in response to the prompting, a new primary address of the user; and
updating, by the computing system, the user address information on file with the new primary address.

17. The non-transitory computer readable medium of claim 16, wherein determining, by the computing system, that the user address information associated with the user is not current comprises:
filtering the plurality of transactions to identify a set of card-present transactions;
identifying within the set of card-present transactions a subset of transactions indicative of transactions initiated near a place of residence;
determining a potential primary address associated with the user based on the location information and the time information associated with each transaction in the subset of transactions; and
determining that a current primary address of the user address information is a threshold distance from the potential primary address.

18. The non-transitory computer readable medium of claim 17, further comprising:
identifying, by the computing system, that a transaction in the plurality of transactions is a card-not-present transaction; and
determining, by the computing system, an IP address from which the transaction originated.

19. The non-transitory computer readable medium of claim 18, further comprising:
determining, by the computing system, a location of the user based on the IP address.

20. The non-transitory computer readable medium of claim 16, wherein prompting, by the computing system, the user to update the user address information establishes a dialogue between the computing system and the user.

* * * * *